Nov. 16, 1971 — L. A. WRIGHT — 3,620,016

MACHINE CONTROL SYSTEM

Filed Jan. 21, 1970 — 2 Sheets-Sheet 1

INVENTOR
LEE A. WRIGHT
BY *[signature]*
ATT'YS.

Nov. 16, 1971  L. A. WRIGHT  3,620,016
MACHINE CONTROL SYSTEM
Filed Jan. 21, 1970  2 Sheets-Sheet 2

INVENTOR
LEE A. WRIGHT
BY Grist Lockwood, Greenawalt & Dewey
ATT'YS.

United States Patent Office 3,620,016
Patented Nov. 16, 1971

3,620,016
MACHINE CONTROL SYSTEM
Lee A. Wright, Kellering, Ohio, assignor to
Mosier Industries, Inc.
Filed Jan. 21, 1970, Ser. No. 4,626
Int. Cl. F15b 7/00
U.S. Cl. 60—54.5
11 Claims

ABSTRACT OF THE DISCLOSURE

The control system includes at least two units which must be operated substantially simultaneously to start operation of a machine. Each unit includes a fluid displacement device, such as a device including a cylinder, a piston movable in the cylinder, a vent passage in the piston and a seal for closing the vent passage when the piston is moved in the cylinder to displace fluid therein. Each cylinder is connected to a chamber having a pressure sensitive transducer, valve or switch associated therewith which is actuated only when a predetermined minimum fluid pressure or minimum fluid volume is established in the chamber by reason of fluid displacement in the units which causes compression of the fluid in the chamber or an increase in the volume of the fluid in the chamber. This minimum operating pressure or volume increase is only established when the two pistons are moved together, first to close the vent passages, and second to displace the fluid trapped in the cylinders.

The present invention relates to a control system for actuating a machine or device by operating two fluid displacement units. More particularly, the present invention, as specifically illustrated, relates to a control system which requires the simultaneous operation of two pressure generating units to actuate a machine or device so that actuation of the machine cannot be effected by "tying down" one of the units and then operating only the other unit.

The "anti-tie down" control system of the present invention is particularly adapted for use on a machine in a factory, machine shop, etc., where it is desired to prevent the operator of the machine from positioning or moving his arm or hand in the working area of the machine. This is accomplished by requiring the operator to manually operate both of the pressure generating units at the same time, one with each hand, to actuate and maintain actuation of the machine. To this end, one preferred embodiment of the control system includes a pressure chamber having the actuator of a pressure sensitive switch, valve, or other transducer associated therewith, the output of the transducer being connected to a machine for actuating same, and first and second fluid displacement units connected to the pressure chamber. Each of the units includes a displacement device, such as a diaphragm or a device including a cylinder communicating with the pressure chamber, a piston movable in the cylinder between a first at rest position and a second fluid compressed position, a vent passage through the piston for venting the cylinder to a fluid reservoir, e.g., atmosphere, when the piston is in the first position, and a seal for sealing the vent passage when the piston is moved toward the second position.

The transducer is operated only when a predetermined minimum operating pressure or volume increase is established in the pressure chamber and this predetermined pressure or volume increase is established only when both of the pistons are moved substantially simultaneously toward the second positions thereof so that the vent passages are closed at the same time and the required fluid displacement is obtained by joint movement of both pistons to the second positions thereof.

A general object of the present invention is to provide a flexible machine control system.

Another object of the present invention is to provide a control system for actuating a machine by simultaneously operating two members and wherein said system cannot be operated by "tying down" one member and operating the other member.

Another object of the present invention is to provide a control system for actuating a transducer, switch or valve by simultaneously operating two members wherein each member is associated with a fluid displacement or pressure generating unit which is normally vented to a fluid reservoir, e.g., atmosphere, and wherein the members must be operated at the same time to seal both units from the reservoir at the same time and to obtain the fluid displacement required for actuating the transducer, switch or valve.

Another object of the present invention is to provide an "anti-tie down" control system including two pressure generating units connected to a pressure chamber having a pressure sensitive switch or valve connected thereto for operating a machine or other device and in which system the pressure generating units must be operated substantially simultaneously in order to develop a predetermined minimum pressure in the pressure chamber for actuating the switch or valve.

Still another object of the present invention is to provide an "anti-tie down" control system including two pneumatic pressure generating units which are each operated by a palm button and which are sealed from atmosphere when the palm button is depressed and are each vented to atmosphere when the palm buttons are released.

These and other objects and advantages of the present invention, including the manner of their attainment, will become apparent from the following detailed description of a preferred embodiment of the invention taken in conjunction with the accompanying drawings wherein.

Figure 1:
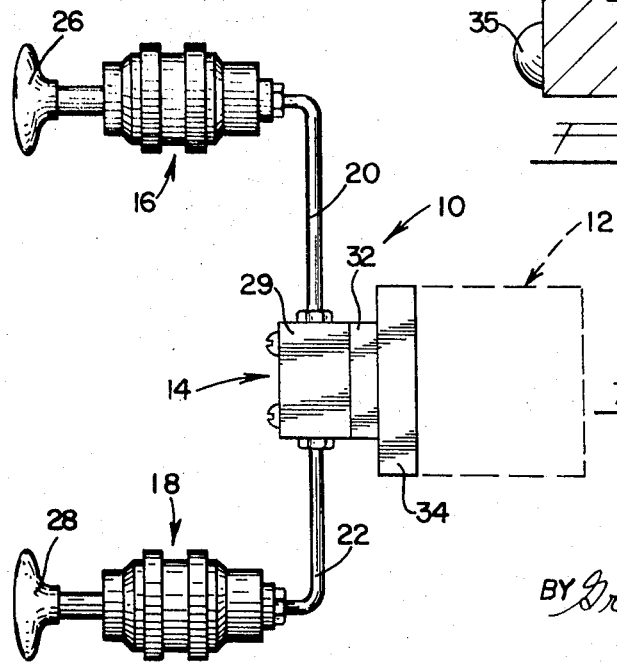
FIG. 1 is a schematic diagram of the "anti-tie down" control system of the present invention, including two pressure generating units and a pilot section operated thereby.

Referring to the drawings in greater detail, the "anti-tie down" control system of the present invention is generally indicated at 10 in FIG. 1 and is adapted to control operation of a device or machine indicated schematically by phantom lines at 12. In the illustrated embodiment, the control system 10 includes a pilot section 14 and two fluid displacing or pressure generating units 16 and 18 which are connected by suitable tubing 20 and 22 to the pliot section 14. Each of the units 16 and 18 includes an operating member 26, 28 in the form of a palm button. In operating the control system 10, each of the palm buttons 26 and 28 must be depressed at the same time to cause actuation of the pilot section 14 to actuate the machine or device 12.

Figure 2:
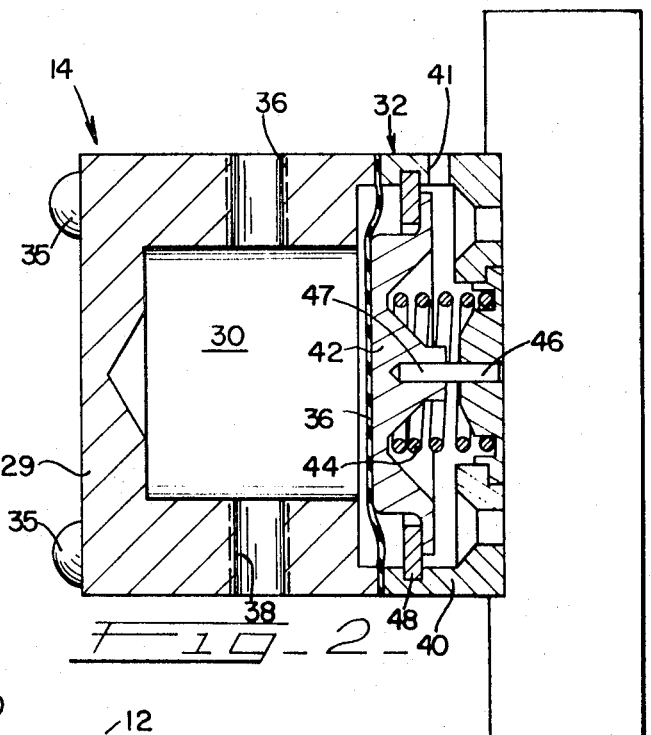
FIG. 2 is an enlarged sectional view of the pilot section shown in FIG. 1.

As best shown in FIG. 2, the pilot section 14 is divided into two parts. The first parts is a hollow block or housing 29 having a pressure chamber 30 therein. The second part is a diaphragm operator 32. The diaphragm operator 32 is adapted to actuate a pliot valve, electric switch or other transducer of known type, generally indicated at 34.

The housing 29 is secured to the diaphragm operator 32 by means of fasteners 35, and has two apertures 36 and 38 therein. The tubings 20 and 22 are connected respectively to the apertures 36 and 38 for communicating the chamber 30 with the units 16 and 18. Also, the housing 29 is open on the one side thereof which is secured to the diaphragm operator 32 so that the pressure of the fluid in the chamber 23 can act on a diaphragm 36 extending across the open side of the housing 29 and secured between the housing 29 and the diaphragm operator 32. In one preferred embodiment, the operating fluid employed is a gas, such as air, although a liquid can also be employed as the operating fluid.

The diaphragm operator 32 includes a hollow base 40 secured to and between the housing 29 and the pilot valve 34 and vented to atmosphere through port 41, a diaphragm pad 42 which bears against the diaphragm 36, and a spring 44 which biases the pad 42 against the diaphragm. A stem or actuator 46 for actuating the transducer 34 has one end 47 thereof received and, if desired, secured in a bore in the diaphragm pad 42. A retainer ring 48 is suitably secured within the base 40 and serves as a stop for limiting movement of the pad 42 against the diaphragm 36 to prevent damage to the diaphragm 36 from the force of the spring 44. With this arrangement, the biasing spring normally holds the diaphragm pad 42 against the retainer ring 48 so that the stem 46 is in a nonactuating position relative to the transducer 34.

When the absolute pressure in the chamber 30 multiplied by the effective area of the diaphragm 36 creates a force which exceeds the pressure on the other side of the diaphragm 36 multiplied by the effective area of the diaphragm 36, plus the bias force exerted by the biasing spring 4, and plus the force required to operate the transducer 34, the stem 46 will be moved inwardly of the transducer 34 to actuate the same. In one preferred embodiment, the transducer 34 is a pilot valve and the pilot section 14 is designed for use with a pilot valve 34 requiring a short stroke (approximately 1/32 of an inch). The short stroke minimizes variable such as changes in the spring force of the spring 44 or a change in effective area of the diaphragm 36 during the stroke. In this embodiment, a gas such as air is used as the operating fluid and the absolute gas pressure necessary in the chamber 30 to actuate the pilot valve 34 is developed by depressing the palm buttons 26 and 28 of both of the pressure generating units 16 and 18 at substantially the same time.

Figure 3:
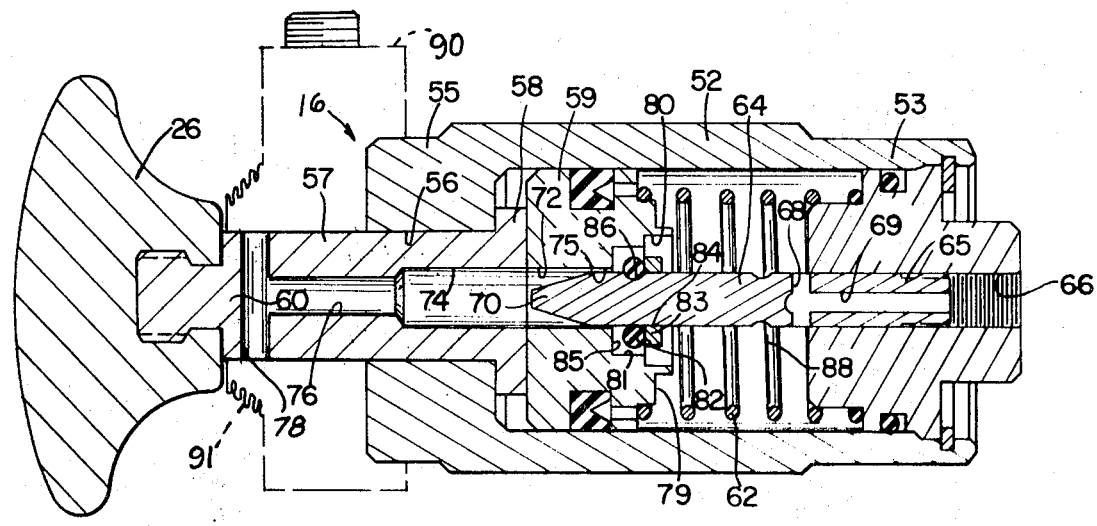
FIG. 3 is an enlarged sectional view of one of the pressure generating units shown schematically in FIG. 1.

Since both of the pressure generating units 16 and 18 are identical, only the pressure generating unit 16 will be described in detail with reference to FIGS. 3–6. As shown in FIG. 3, the unit 16 includes a cylinder 52 which is closed off at one end 53 by an end cap 54. The other end 55 of the cylinder 52 has an opening 55 through which a piston rod 57 extends. One end 58 of the piston rod 57 engages a piston 59 within the cylinder 52 and is secured at its other end 60 to the palm button 26. A spring 62 is positioned in the cylinder 52 between the end cap 54 and the piston 59 to hold the piston 59 in a first, at rest, position thereof at the end 55 of the cylinder 52.

A stem 64 is situated within the cylinder 52 and is secured at one end 65 in a bore 66 which extends through the end cap 54. This stem 64 has passageways 68 and 69 formed therein for communicating the interior of the cylinder 52 with the bore 65 to which the tubing 20, leading to the pressure chamber 30, is connected in a suitable manner (not shown).

The other or free end 70 of the stem 64 extends toward the piston 59 and the piston rod 57 which have, respectively, openings 72 and 74 formed therein for receiving the stem 64 when the piston rod 57 is pushed into the cylinder 52. It will be noted that the diameter of the stem 64 is smaller than the diameter of the openings 72 and 74 so that a passageway 75 is formed between the stem 64 and the opening 72 (and between the opening 74 when the piston 59 is pushed into the cylinder 52).

The piston rod 57 is formed with additional passages 76 and 78 for communicating the opening 74 with a reservoir (not shown) or atmosphere. With this construction, the passageway 75, the openings 72 and 74 and the passages 76 and 78 define a venting means for venting the interior of the cylinder 52 between the side 79 of the piston 59 and the end cap 54. Also, the fit between the piston rod 57 and the opening or bore 56 is loose so that the space above the piston 59, e.g., between the other side of the piston 59 and the end 55 of the cylinder 52, is vented to the reservoir or to atmosphere.

Figure 7:
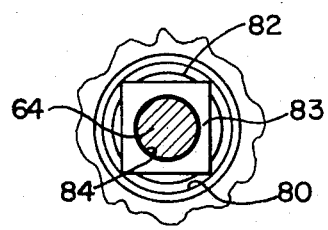
Figure 4:
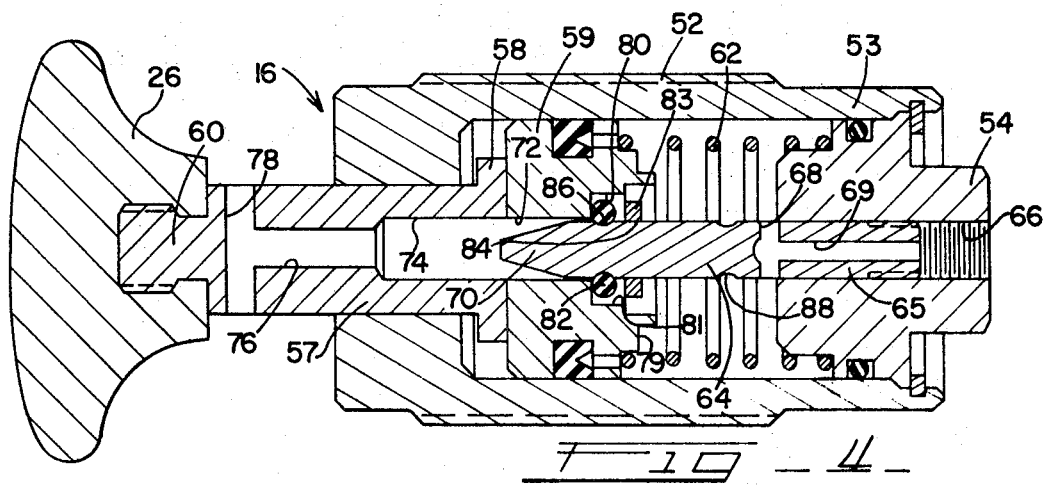
FIG. 4 is a sectional view similar to FIG. 3 showing the piston of the pressure generating unit as it is being moved toward the fully compressed position.

As shown in FIGS. 3–6, the side 79 of the piston 59 facing the end plug 54 has first and second stepped annular recesses 80 and 81 which are concentric with the opening 72. A resilient O ring 82 is slidably mounted on the stem 64 and is held within the annular recess 81 by a square retaining plate 83 which is press fitted into the recess 80 as best shown in FIG. 7. The plate 83 has a bore 84 therethrough which as a diameter larger than the diameter of the stem 64 so that the plate 83 can freely move axially of the stem 64. When the piston 59 is moved into the cylinder 52 by depression of the palm button 26, the bottom 85 of the recess 81 will engage the O ring 82 and move the same along the stem 64 and in this way seal the passageway 75 as shown in FIG. 4. Similarly, when pressure on the palm button 26 is release and the spring 62 acts against the piston 59 to move the same to its at rest position at the one end 55 of the cylinder 52, the retaining plate 83 engages the O ring 82 and moves the same along the stem 64 to return the O ring 82 to its first position shown in FIG. 3. Since the O ring 82 does not engage the bottom 85 of the recess 81 during the return stroke, the passageway 75 is open to vent compressed or displaced fluid to the reservoir or to atmosphere.

Preferably, the stem 64 is provided with first and second annular notches or recesses 86 and 88 which are adapted to momentarily hold the O ring 82 in place in a first or second position thereof on the stem 64 when the piston 59 is moved to or from its fluid compressed position at the end 53 of the cylinder 52 to provide positive resistance to axial movement of the O ring on the stem 64. Thus, at the start of the compression stroke of the piston 59 toward the end cap 55, the bottom 85 of the recess 81 will engage the O ring 82 which is momentarily held in the recess 86. Likewise the recess 88 is adapted to momentarily hold the O ring 82 at the start of the return stroke on the piston 59 to provide positive resistance to axial movement of the O ring 82 on the stem 64 when the retaining plate 83 engages the O ring 82.

Although the normal friction of the O ring 82 on the stem 64 will momentarily hold the O ring 82 against axial movement, the recesses 86 and 88 are preferred since they provide added resistance to axial movement and thereby ensure that the O ring 82 will not stick to the plate 83 or the bottom 85 of the recess after a period of continued use of the unit 16. Also, the annular recesses 86 and 88 permit the O ring 82 to relax when the unit 16 is in its normal non-operating position, shown in FIG. 3, or in its fully operated position shown in FIG. 5, and, in this way, prevent stretching of the O ring 82 when the piston 59 is in its first or second position. The recess 86 locates the O ring 82 in its first position and the recess 88 locates the O ring in its second position.

Referring now to the operation of the pressure generating unit 16, utilizing air for the operating fluid, it will be understood that when the piston rod 57 is moved into the cylinder 52 by exerting pressure on the palm button 26, the bottom 85 of the recess 81 is forced against the O ring 82. When this occurs, the passage 75 formed between the stem 64 and the opening 72 is closed or sealed as shown in FIG. 4. Then, during continued movement of the piston 59 from the first position thereof shown in FIG. 3 toward the second position thereof shown in FIG. 5, the air trapped within the cylinder 52 is compressed, provided the unit 18 is operated in like manner at substantially the same time.

It will be understood, that the cylinders 52 of each of the pressure generating units 16 and 18, the tubings 20 and 22 and the pressure chamber 30 have a total volume $V_t$. Each of the cylinders 52 have a displaceable volume $V_c$ which is displaced when the piston 59 thereof is moved to its second position. In the illustrated embodiment, the anti-tie down control system 10 is operated by trapping and compressing a volume $V_c$ of ambient air in each of the pressure generating units simultaneously. In other words, the total volume $V_t$ is reduced to a volume equal $V_t - 2V_c$ when each of the pistons 59 is moved at the same time from its first position to its second position. The absolute pressure $P_0$ in the chamber 30 is then increased to a value equal to the ambient atmospheric pressure $$P_b \times \frac{V_t}{V_t - 2V_c}$$

and the system is designed so that $$P_b \times \frac{V_t}{V_t - 2V_c}$$

is greater than the minimum operating pressure needed to move the diaphragm pad 42 to actuate the pilot valve 34.

If a liquid is employed for the operating fluid instead of a gas (air) then the volume of the liquid in the chamber 30 will be increased by the movement of the pistons 59 in the units 16 and 18, and the system volume parameters $V_t$ and $V_c$ will be such that the transducer 34 will be actuated only when both units 16 and 18 are operated at substantially the same time. When the system 10 is modified to employ liquid as the operating fluid, each of the units 16 and 18 will have a liquid holding adapter secured to the end 55 of the cylinder 52 and the rod 57, such as the adapter indicated by phantom lines at 90 in FIG. 3. As shown, the adapter 90 can include a bellows diaphragm 91 secured to the outer end 60 of the rod 57 to allow for movement of the rod 57 relative to the cylinder end 55 while maintaining a hermetically sealed connection between the adapter 90 and the rod 57. Typically, the liquid can be supplied from an overhead reservoir (not shown).

Each of the pressure generating units 16 and 18 is normally in a position shown in FIG. 3. In this position, each unit is vented to the reservoir or to atmosphere because the passageway 75 is not sealed by the engagement of the O ring 82 with the bottom 85 of the recess 81. Then, when each of the palm buttons 26 and 28 are depressed at substantially the same time, the venting passageways 75 are sealed by reason of the engagement of the O ring 82 with the bottom 85 of the recess 81 in the piston 75. Here, it will be noted that each of the palm buttons must be moved at approximately the same time so that both pressure generating units are first simultaneously sealed from the atmosphere or the reservoir and second jointly operated to establish the necessary minimum operating pressure for actuating the pilot valve 34.

Figure 5:
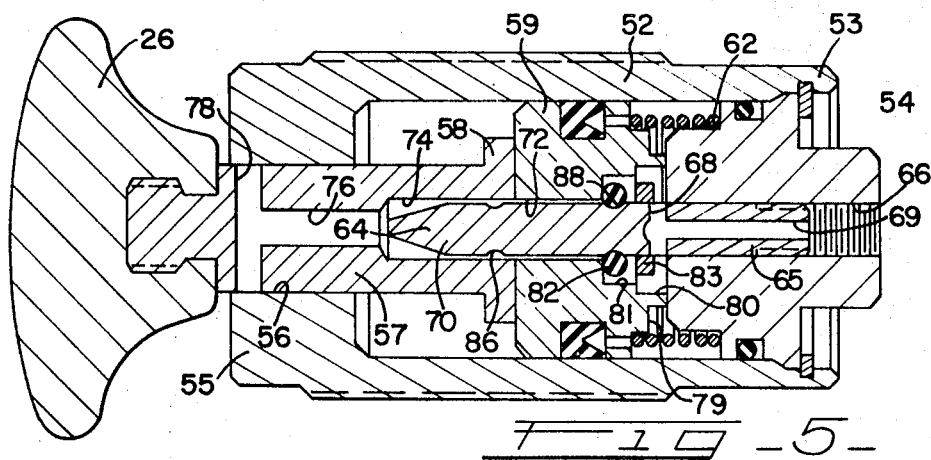
FIG. 5 is a sectional view similar to FIG. 3 showing the piston in the fully compressed position.

In FIG. 5, the generating unit 16 is shown in the fully operated position. Here, the piston 59 of the generating unit 16 is fully compressed and if both units 16 and 18 have been fully operated at the same time, the total volume of the trapped fluid such as air is sufficiently reduced to establish a pressure equal to or greater than the predetermined minimum pressure necessary in the chamber 30 to move the diaphragm 36 and diaphragm pad 42 to actuate the pilot valve 34.

Each unit remains sealed from the reservoir or atmosphere in this position because the O ring 82 is still engaging the bottom 85 of the recess 81 to seal the passageway 75. The friction of the O ring 82 on the stem 64 plus the increased pressure of the trapped fluid maintains the seal during the compression stroke of the piston from the position shown in FIG. 4 to the position shown in FIG. 5. When both of the pistons 59 are in the position shown in FIG. 5, the anti-tie down system 10 has operated the pilot valve 34 because the maximum volume of air has been trapped and compressed and the pilot valve 34 will remain actuated so long as both units 16 and 18 are in the fully operated position shown in FIG. 5.

Figure 6:
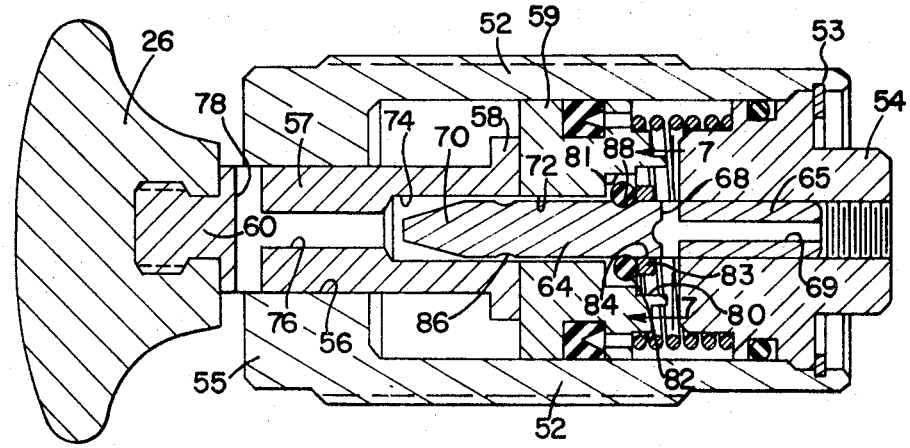
FIG. 6 is a sectional view similar to FIG. 3 showing the piston after it is released and is beginning its return stroke to its at rest position; and, FIG. 7 is a fragmentary sectional view taken along line 7—7 of FIG. 6.

With the palm button 26 fully depressed, the cylinder 52 cannot be vented to atmosphere until the piston 59 is moved to the position shown in FIG. 6. When this occurs, the bottom 85 of the recess 81 is also moved away from the O ring 82 which is held in the recess 88 to open passageway 75. Thus, when the palm button 26 is released, the spring 62 forces the piston 59 toward its first, at rest, position and, at the beginning of the return stroke of the piston 59, the cylinder 52 is vented to atmosphere to allow trapped and compressed air to escape to atmosphere via the passageway 75, openings 72 and 74, and passages 76 and 78. In this way, the control system 10 stops the operation of the pilot valve 34 when the palm button 26 or 28 of either unit is released. Also, the retaining plate 83 will engage the O ring 82, force the same out of the annular recess 88, and move the same to its first, at rest, position where the O ring 82 is received in the first annular recess 86, thereby properly positioning the O ring 82 for the next operation of the pressure generating unit 16.

The control system 10 will not operate when only one palm button 26 is depressed because the other pressure generator unit 18 is vented through passageway 75, openings 72, 74 and passages 76 and 78. Thus, both palm buttons 26 and 28 have to be depressed at substantially the same time to develop a pressure in the chamber 30 greater than the predetermined minimum operating pressure required to move the diaphragm 36 and diaphragm pad 42 against the force of atmospheric pressure acting on the diaphragm 36, the force of the biasing spring 44 and the force needed to operate the pilot valve 34.

The system 10 also will not operate when one palm button 26 is depressed and "tied down," and then the other palm button 28 is depressed. This is because the unit 18 is vented to atmosphere when the unit 16 is operated and volume $V_c$ is only displaced and not compressed as the air forced out of the cylinder 52 of the unit 16 escapes through the vented unit 18. Then, when the unit 18 is operated, the pressure developed is insufficient to actuate the pilot valve 34 since this pressure $$\frac{V_t - V_c}{V_t - 2V_c} \times P_b$$

is less than the predetermined minimum operating pressure.

When the unit 16 is "tied" in a sealed position with the venting passageway 75 sealed as shown in FIG. 4 and then the unit 18 is fully operated to the position shown in FIG. 5 the system 10 will not operate because insufficient pressure is developed within the pressure chamber 30 to operate the machine 12, e.g.

$$\frac{V_t}{V_t - V_c} \times P_b$$

is less than the minimum pressure necessary to move the diaphragm pad 42 to actuate the pilot valve 34.

If the unit 16 is first "tied" in the sealed position shown in FIG. 4 and then the unit 18 is fully operated and "tied" in this position shown in FIG. 5, followed by fully operating the unit 16, the system will be operated once. However, at the beginning of the return stroke of the piston 59 of the unit 16, the system is vented and will not operate again while the unit 18 is "tied down."

Thus, the control system 10 cannot be effectively "tied down" and is therefore referred to as an anti-tie down control system. Such an anti-tie down control system 10 finds advantageous use in controlling a wide variety of equipment or machines that are potentially hazardous to operating personnel. Some examples of such hazardous equipment or machines are as follows: punch presses, drawing presses, fixtures with powered locators or clamps, molding machines, metal working machines with automatic feeds, or any other machine or system where it is desired to keep both hands of the operator busy so that neither one of the hands or arms of the operator can be moved into a hazardous location relative to operating parts of the machine.

In summary, some of the advantages of the control system 10 of the present invention when utilizing air for the operating fluid are as follows:

(1) Each pressure generating unit 16 or 18 is normally vented to atmosphere when it is not being operated and the venting passageway 75 will be closed or sealed just after the initial depression of the palm button 26 or 28.

(2) Each pressure generating unit 16 or 18 vents the compressed air of the system immediately after releasing the palm button 26 or 28.

(3) The design of the components of the control system 10 is such that a short stroke of the diaphragm can be utilized so that the components of the whole system can be easily matched with respect to an operating range of pressure differential required to actuate the pilot valve 34 or other switch.

(4) The control system 10 requires substantially simultaneous operation of both of the pressure generating units 16 and 18 to actuate the pilot valve 34 or other switch, e.g., the pilot valve 34 will only be actuated when both pressure generating units 16 and 18 are sealed substantially simultaneously and then jointly operated.

(5) The diaphragm operator 32 in the pilot section 14 is designed so that the pilot valve 34 will be fully actuated within a very narrow range of pressure differential across the diaphragm 36. This is due to the small changes in spring rate of the spring 44 resulting from a small stroke, the small change of the effective area of the diaphragm 36, and the short travel of the diaphragm pad 42 and stem 46 during full actuation. This feature minimizes the effect of volume change in the pilot section and minimizes pressure differential requirements in the pilot section 14 during full actuation of the pilot valve 34.

The foregoing detailed description has been largely confined to the operation of a pneumatically operated control system where air is employed for the operating fluid. This has been done to fully explain an important use of the invention as an "anti-tie down" control system which needs no external power or special operating fluid. However, it is to be understood that the system 10 can be modified, as indicated in the foregoing description, to employ a liquid for the operating fluid. By using a liquid stored in an overhead reservoir, a predetermined head pressure can be established in the pressure chamber 30 to permit pressure control of the position of the diaphragm 36. With such a modified system, a plurality of units 16 can be employed and a purality of transducers can be operatively engaged with the stem 46 and can be adapted for sequential operation as the pressure is varied in the pressure chamber 30 by the simultaneous operation of two or more units 16. For example, one transducer will be operated when two units 16 are operated simultaneously, another transducer when three units 16 are operated simultaneously, and so on.

It is also to be understood that the units 16 may be operated by mechanical means in place of manual operation. For example, cams, hammers, links, striker arms and the like can be employed for moving the piston rods 57. In such a modified system, some of the units 16 can be sealed, i.e., the passages 72, 74, 76 and 78 in the piston 59 and piston rod 57 as well as the stem 64 can be eliminated from some of the units 16, with only one or two of the units 16 being vented to the reservoir or to atmosphere.

Additionally, in a multi-transducer-multi-control system, it may be desirable to have a closed system, where none of the units is vented, to provide a system which automatically compensates for variations in temperature and barometric pressure.

Moreover, in such a multi-control system, other modifications of the system 10 may be desirable, some of which are as follows:

(1) Two diaphragms and diaphragm operators can be connected to the pressure chamber, such that operation of two units 16 will cause actuation of the transducer associated with one of the diaphragm operators and operation of three units 16 will cause actuation of the transducer associated with the other diaphragm operator.

(2) A plurality of systems 10 can be employed where the stem 46 from one of the systems opposes the stem 46 from another of the systems. In this way, operation of the units 16 of one system can be used to prevent, interrupt or terminate operation of one or more transducers associated with another system. For example, the components of two systems can be arranged such that the fluid displacement resulting from the operation of the units 16 of one system will develop a pressure which acts on the reverse (pad) side of the diaphragm 36 in the other system.

It will be understood that a multi-transducer-multi-control system permits the assembly of a machine logic system which is inexpensive, durable, easily maintained, and does not require a motor driven source of fluid pressure with the latter feature being, perhaps, the most important.

Additionally, such a logic system may be operated safely and reliably, and easily maintained, in numerous adverse environments such as in an explosive or dusty ambient atmosphere.

I claim:

1. A control system adapted for use with a transducer for actuating a device by the substantially simultaneous operation of at least two members, said system including a chamber, means connected to said chamber for transmitting the fluid pressure or fluid volume established in said chamber to said transducer with said transducer only being operated to actuate said device when a predetermined minimum fluid pressure or minimum fluid volume is established in said chamber, and first and second fluid displacing units, each of said units having a movable means therein which is connected to one of said operating members, each of said movable means being movable in one of said units between a first portion and a second position for displacing fluid from said unit, means communicating each of said units with said chamber whereby the pressure generated or fluid displaced by moving each of said movable means to its said second position is transmitted to said chamber, means for venting each of said units to a reservoir or to atmosphere when said movable means therein is in said first position, and means for closing each of said venting means when said movable means associated therewith is moved toward said second position, whereby said predetermined minimum fluid pressure or minimum fluid volume is established in said chamber only when said movable means of both of said units are moved substantially simultaneously toward the second positions thereof, such that said venting means of each of said units is closed at approximately the same time and said predetermined minimum fluid pressure or minimum fluid volume is established in said chamber only by the joint movement of both of said movable means to the second positions thereof.

2. The control system as defined in claim 1 wherein each of said fluid displacing units includes means for biasing said movable means therein toward said first position.

3. A control system as defined in claim 1 wherein each of said units includes a cylinder and said movable means therein includes a piston movable in said cylinder between a first, at rest, positon at one end of said cylinder and a second, fluid displaced position, at the other end of said cylinder.

4. The control system as defined in claim 3 wherein said venting means of each unit includes passage mean in said piston of each unit, through which fluid in said cylinder is vented to said reservoir or to atmosphere and said vent closing means includes sealing means for sealing said passage means when said piston is moved toward said second position to displace or compress fluid trapped in said cylinder.

5. A control system as defined in claim 4 wherein said closing means includes a stem which has one end fixed to one end of said cylinder and a free end which extends into, and partially restricts, said passage means, and a ring which is slidably mounted on said stem and which is adapted to close said passage means when said ring is engaged by said piston as said piston is moved toward said second position.

6. A control system as defined in claim 5 wherein said passage means is opened at the beginning of the return stroke of said piston to said first position to vent displaced or compressed fluid to said reservoir or to atmosphere and said piston has means thereon for moving said ring on said stem on the return stroke of said piston to thereby properly position said ring for closing said passage means when said piston is again moved toward said second position.

7. A control system as defined in claim 5 wherein said ring is resilient.

8. A control system as defined in claim 7 wherein said stem has at least one annular locating recess near said free end thereof which is adapted to receive and properly locate said ring relative to said passage means when said piston is moved to its first, at rest, position and which allows said ring to relax when said control system is not being operated.

9. A control system as defined in claim 7 wherein said stem has at least one annular locating recess near said fixed end of said stem, said recess being adapted to receive said ring when said piston is moved to said second position and to momentarily hold said ring therein when said piston begins its return stroke to ensure that said passage means is opened to vent trapped and displaced or compressed fluid to said reservoir or to atmosphere.

10. The control system as defined in claim 1 wherein said pressure transmitting means includes a diaphragm operator and a diaphragm situated between said chamber and said diaphragm operator, said diaphragm operator being moved to actuate said transducer only when at least said predetermined minimum fluid pressure or minimum fluid volume is established in said chamber.

11. The control valve as defined in claim 10 wherein said diaphragm operator includes a diaphragm pad which is spring biased against said diaphragm whereby said diaphragm operator can be easily used with a transducer having a short operating stroke.

References Cited

UNITED STATES PATENTS

| 1,549,459 | 8/1925 | Davis | 91—424 |
| 2,171,557 | 9/1939 | Higley | 91—424 |
| 2,287,389 | 6/1942 | Mercier | 60—62.5 |

FOREIGN PATENTS

| 859,911 | 1/1961 | Great Britain | 60—54.6 |
| 954,422 | 4/1964 | Great Britain | 60—54.6 |

MARTIN P. SCHWADRON, Primary Examiner

A. M. ZUPCIC, Assistant Examiner

U.S. Cl. X.R.

60—62.5